US007457885B2

(12) United States Patent
Chan et al.

(10) Patent No.: US 7,457,885 B2
(45) Date of Patent: Nov. 25, 2008

(54) POWERLINE COMMUNICATION SYSTEM AND METHOD USING COUPLER DESIGN FOR ADDITIONAL USERS

(75) Inventors: Tat Keung Chan, South San Francisco, CA (US); Songly Mu, Salida, CA (US)

(73) Assignee: Asoka USA Corporation, Foster City, CA (US)

( * ) Notice: Subject to any disclaimer, the term of this patent is extended or adjusted under 35 U.S.C. 154(b) by 469 days.

(21) Appl. No.: 11/056,135

(22) Filed: Feb. 10, 2005

(65) Prior Publication Data
US 2006/0176898 A1 Aug. 10, 2006

(51) Int. Cl.
*G06F 15/16* (2006.01)
*G05B 11/01* (2006.01)

(52) U.S. Cl. .................. 709/250; 709/218; 340/310.11

(58) Field of Classification Search .................. None
See application file for complete search history.

(56) References Cited

U.S. PATENT DOCUMENTS

| 5,684,826 A | 11/1997 | Ratner |
| 5,812,557 A | 9/1998 | Stewart et al. |
| 6,018,690 A | 1/2000 | Saito et al. |
| 6,130,896 A | 10/2000 | Lueker et al. |
| 6,188,557 B1 | 2/2001 | Chaudhry |
| 6,243,413 B1 | 6/2001 | Beukema |
| 6,272,551 B1 | 8/2001 | Martin et al. |
| 6,343,079 B1 | 1/2002 | Way et al. |
| 6,388,564 B1 | 5/2002 | Piercy et al. |
| 6,560,319 B1 | 5/2003 | Binder |
| 6,668,058 B2 | 12/2003 | Grimes |
| 6,668,328 B1 | 12/2003 | Bell |
| 6,757,368 B2 | 6/2004 | Binder |
| 6,759,946 B2 | 7/2004 | Sahinoglu et al. |
| 6,775,121 B1 | 8/2004 | Chaudhry |

(Continued)

FOREIGN PATENT DOCUMENTS

DE 100 08602 A1 6/2001

(Continued)

OTHER PUBLICATIONS

Evans; "The CEBus Standard User's Guide, The Training Department Publications, May 1996."

*Primary Examiner*—John B. Walsh
(74) *Attorney, Agent, or Firm*—Townsend and Townsend and Crew LLP (57) ABSTRACT

A powerline network system. An embodiment of the present invention provides a powerline network device. The device includes a first network interface connected to a data source, the first network interface being configured to receive network data in a first format. The device also includes a first powerline communication module configured to convert data from the first format to a second format. The device further includes a switch having an input port and N output ports, the input port being connected to the first powerline communication module. Also, the device includes a plurality of powerline communication modules, the plurality of power communication modules including a second powerline communication module and a third powerline communication module. Moreover, the device includes a first powerline coupler, the first powerline coupler being configured to couple a first data signal from the second powerline communication module to a first phase, a second phase, and a third phase of a powerline.

11 Claims, 7 Drawing Sheets

U.S. PATENT DOCUMENTS

| | | |
|---|---|---|
| 6,842,459 B1 | 1/2005 | Binder |
| 6,880,020 B1 | 4/2005 | Rubinstein et al. |
| 6,885,674 B2 | 4/2005 | Hunt et al. |
| 6,904,134 B2 | 6/2005 | Jeon et al. |
| 6,927,340 B1 | 8/2005 | Binder et al. |
| 6,947,409 B2 | 9/2005 | Iwamura |
| 6,958,680 B2 | 10/2005 | Kline |
| 6,965,302 B2 | 11/2005 | Mollenkopf et al. |
| 6,980,090 B2 * | 12/2005 | Mollenkopf ................. 375/258 |
| 7,007,305 B2 | 2/2006 | Carson et al. |
| 7,016,368 B2 | 3/2006 | Binder |
| 7,035,280 B2 | 4/2006 | Binder |
| 7,095,756 B2 | 8/2006 | Binder |
| 7,136,936 B2 | 11/2006 | Chan et al. |
| 7,194,528 B1 * | 3/2007 | Davidow .................... 709/223 |
| 2002/0014972 A1 | 2/2002 | Danielson et al. |
| 2003/0224784 A1 * | 12/2003 | Hunt et al. ............... 455/426.2 |
| 2004/0001440 A1 | 1/2004 | Kostoff, II et al. |
| 2004/0125870 A1 | 7/2004 | Yamazaki |

FOREIGN PATENT DOCUMENTS

| | | |
|---|---|---|
| DE | 100 12235 C2 | 12/2001 |
| DE | 100 47648 A1 | 4/2002 |
| DE | 101 0353 A1 | 8/2002 |
| DE | 101 03530 A1 | 8/2002 |
| DE | 100 59564 A1 | 9/2002 |
| DE | 101 19039 A1 | 12/2002 |
| DE | 101 19040 A1 | 12/2002 |
| DE | 10119040 A1 | 12/2002 |
| DE | 100 42958 C2 | 1/2003 |
| EP | 0 822 721 A2 | 2/1998 |
| EP | 1 043 866 A2 | 10/2000 |
| EP | 1 251 646 A2 | 10/2002 |
| WO | WO 01/63787 A1 | 8/2001 |
| WO | WO 02/37712 A1 | 5/2002 |

\* cited by examiner

POWERLINE COMMUNICATION SYSTEM AND METHOD USING COUPLER DESIGN FOR ADDITIONAL USERS

CROSS-REFERENCES TO RELATED APPLICATIONS

This present application is related to U.S. Ser. No. 10/712,748 filed Nov. 11, 2003, which claims priority to U.S. Provisional Application No. 60/508,482 filed Oct. 3, 2003, commonly assigned and hereby incorporated for all purposes.

BACKGROUND OF THE INVENTION

The present invention relates generally to power line networking techniques. More particularly, the invention provides a method and apparatus for installing a multiport powerline networking device onto multiple power supply panels for commercial building applications or the like. Merely by way of example, the invention has been applied to an Ethernet network for building area networking applications, but it would be recognized that other applications exist. The other applications may include any other that may have multiple power supply panels, which feed power into selected regions of use, e.g., apartment, hotel, office, hospital, plant.

Telecommunication techniques have been around for numerous years. In the early days, a communication technique known as telegraph was developed. Telegraph generally transferred information from one geographical location to another geographical location using electrical signals in the form of "dots" and "dashes" over transmission lines. An example of commonly used electrical signals is Morse code. Telegraph has been, for the most part, replaced by telephone. The telephone was invented by Alexander Graham Bell in the 1800s to transmit and send voice information using electrical analog signals over a telephone line, or more commonly a single twisted pair copper line. Most industrialized countries today rely heavily upon telephone to facilitate communication between businesses and people, in general.

In the 1990s, another significant development in the telecommunication industry occurred. People began communicating to each other by way of computers, which are coupled to the telephone lines or telephone network or other communication network. These computers or workstations coupled to each other can transmit many types of information from one geographical location to another geographical location. In general, there have been various types of computer networks, including local area networks, commonly called LANs, and wide are networks, commonly called WANs.

Local area networks have been used to connect computers in a smaller geographic region than wide area networks. Most local area networks rely upon dedicated cables to transmit the communication signals through the network. An alternative way of transmitting such communication signals through non-dedicated cables but through a power supply network is referred to as Powerline Communication, commonly called PLC. Powerline communication relies upon pre-existing powerlines that are used to supply electrical power distributed through buildings, such as homes and office structures. Conventional PLC relies upon radio frequency technologies. Although powerline communications have been successful in part, many limitations still exist.

From the above, it is seen that improved techniques for powerline networks are highly desired.

BRIEF SUMMARY OF THE INVENTION

According to the present invention, techniques for powerline networking techniques are provided. More particularly, the invention provides a method and apparatus for installing a multiport powerline networking device onto multiple power supply panels for commercial building applications. Merely by way of example, the invention has been applied to an Ethernet network for building area networking applications, but it would be recognized that other applications exist. The other applications may include any other that may have multiple power supply panels, which feed power into selected regions of use, e.g., apartment, hotel, office, hospital, plant.

In a specific embodiment, the invention provides a powerline network system, which has various elements. The system has a power transformer device at a public utility facility and a powerline box coupled to the transformer device. The powerline box comprises at least three lines including a first phase, a second phase, and a third phase. Preferably, the first phase, the second phase, and the third phase are derived from the power transformer device. The system has a powerline coupler (i.e., capacitor) coupled to the first phase, the second phase, and the third phase. A multichannel data communication device is coupled to the powerline coupler. Preferably, he multichannel data communication device includes N channels, whereupon N is an integer greater than 8.

The multichannel data communication device provides data communication signals (e.g., orthogonal frequency division multiplexed signals or like signals (OFDM)) to the first phase, the second phase, and the third phase through the powerline coupler.

In an alternative specific embodiment, the present invention provides a powerline network system. The system includes a power transformer device at a public utility facility. The system has a powerline box coupled to the transformer device. In a preferred embodiment, the powerline box comprises at least three lines including a first phase, a second phase, and a third phase. The first phase, the second phase, and the third phase are derived from the power transformer device. The system has a powerline coupler coupled to the first phase, the second phase, and the third phase and a multichannel data communication device coupled to the powerline coupler. In a preferred embodiment, the multichannel data communication device includes N channels, whereupon N is an integer greater than 8. The system has a first capacitor and a second capacitor coupled to the first phase and a first length of wiring between the first capacitor and the second capacitor. Preferably, the first length of wire is inductively coupled to one or more powerline communication devices. The system has a third capacitor and a fourth capacitor coupled to the second phase and a second length of wiring between the third capacitor and the fourth capacitor. Preferably, the second length of wiring is inductively coupled to one or more powerline communication devices. The system has a fifth capacitor and a sixth capacitor coupled to the third phase and a third length of wiring between the fifth capacitor and the sixth capacitor. Preferably, the third length of wiring is inductively coupled to one or more powerline communication devices.

In an alternative specific embodiment, the present invention provides a method for converting a first electrical wiring distribution in a first portion of a building structure and a second electrical wiring distribution in a second portion of the building structure into a first powerline communication network and a second powerline communication network. The method installs a multichannel data communication device comprising at least N channels within a portion of a building structure. In a preferred embodiment, the multichannel communication device comprises a powerline coupler coupled to each of the N channels. The method includes installing an AC coupling device between a first powerline panel box comprising a first phase, a second phase, and a third phase and a second powerline panel box comprising a first phase, a second phase, and a third phase. In a preferred embodiment, the AC coupling device is coupled between the first powerline panel box and the second powerline panel box. The AC coupling device has a first capacitor coupling a first phase of the first powerline panel box to a first phase of the second powerline panel box, a second capacitor coupling a second phase of the first powerline panel box to a second phase of the second powerline panel box, and a third capacitor coupling a third phase of the first powerline panel box to a third phase of the second powerline panel box. The method initiates operation of the multichannel communication device to provide transfer of data signals (e.g., OFDM) in a first format to a second format. The method then forms a first powerline network coupled to the first phase, the second phase, and the third phase of the first powerline panel and forms a second powerline network coupled to the first phase, the second phase, and the third phase of the second powerline panel.

In yet an alternative specific embodiment, the present invention provides a powerline network system for building area networking. The system has a multichannel data communication device comprising at least N channels. A powerline coupler is coupled to each of the N channels. A first powerline panel box comprises a first phase, a second phase, and a third phase. A second powerline panel box comprises a first phase, a second phase, and a third phase. An AC coupling device is coupled between the first powerline panel box and the second powerline panel box. In a preferred embodiment, the AC coupling device has a first capacitor coupling a first phase of the first powerline panel box to a first phase of the second powerline panel box, a second capacitor coupling a second phase of the first powerline panel box to a second phase of the second powerline panel box, and a third capacitor coupling a third phase of the first powerline panel box to a third phase of the second powerline panel box. The system has a first powerline network coupled to the first phase, the second phase, and the third phase of the first powerline panel. The system also has a second powerline network coupled to the first phase, the second phase, and the third phase of the second powerline panel. In a preferred embodiment, the system has a first set of channels derived from the N channels in the first powerline network and a second set of channels derived from the N channels in the second powerline network.

Numerous benefits are achieved using the present invention over conventional techniques. The present invention can be applied using conventional components from computer networking and hardware technologies. Additionally, the invention can be applied to pre-existing powerline structures without substantial modification. Preferably, the present system and method are easy to implement and also selectively connect and depending upon the user. In preferred embodiments, the invention also provides for security between users. Depending upon the embodiment, one or more of these benefits may exist. Additionally, the present system and method can provide for multiple channels of powerline networking capability without pulling additional networking and/or powerlines according to a preferred embodiment. These and other benefits have been described throughout the present specification and more particularly below.

Various additional objects, features and advantages of the present invention can be more fully appreciated with reference to the detailed description and accompanying drawings that follow.

DETAILED DESCRIPTION OF THE INVENTION

According to the present invention, techniques for power line networking techniques are provided. More particularly, the invention provides a method and apparatus for installing a multiport powerline networking device onto multiple power supply panels for commercial building applications. Merely by way of example, the invention has been applied to an Ethernet network for building area networking applications, but it would be recognized that other applications exist. The other applications may include any other that may have multiple power supply panels, which feed power into selected regions of use, e.g., apartment, hotel, office, hospital, plant.

Figure 1:
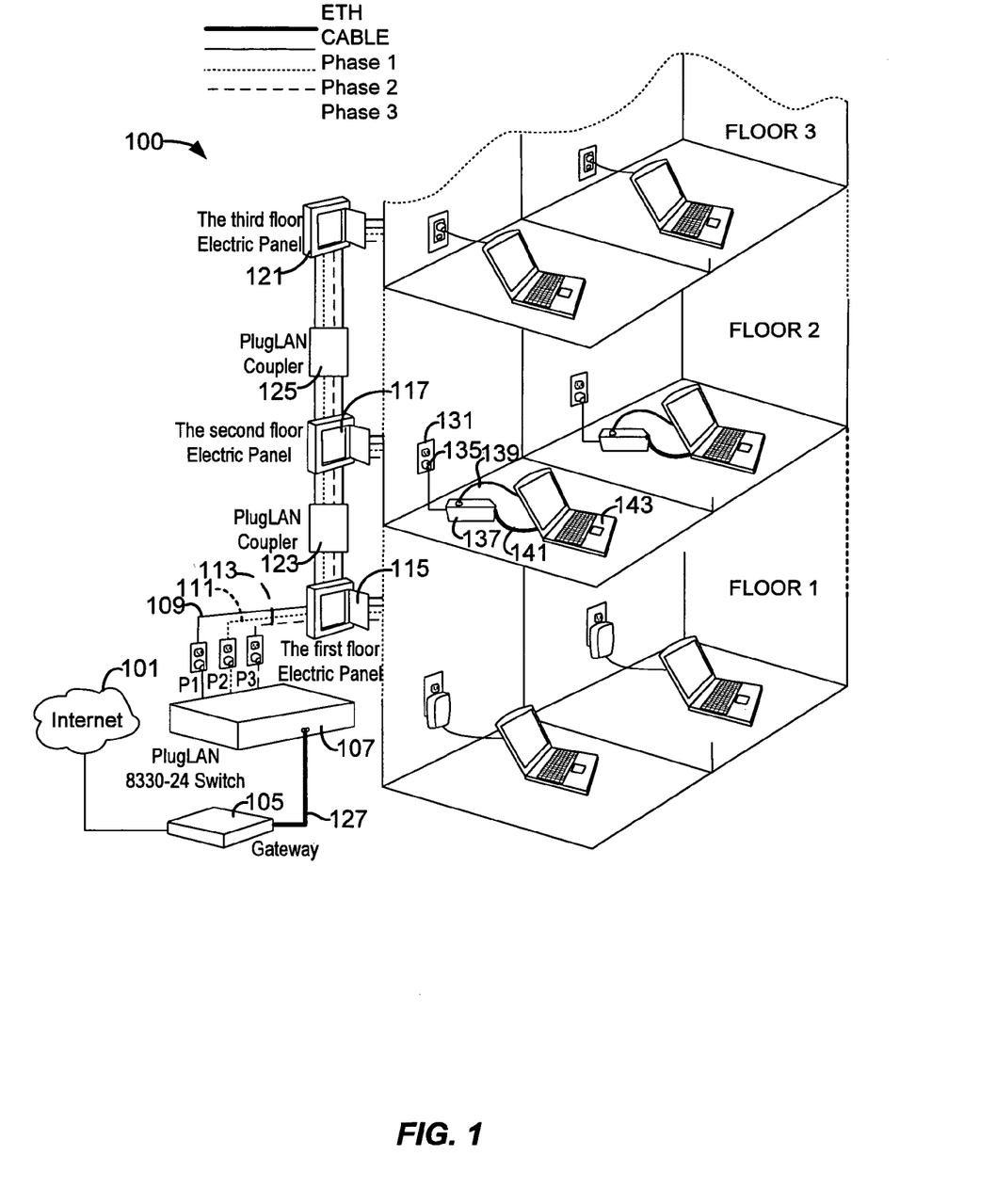
FIG. 1 is a simplified diagram of a powerline system according to an embodiment of the present invention.

FIG. 1 is a simplified diagram of a powerline system 100 according to an embodiment of the present invention. This diagram is merely an example, which should not unduly limit the scope of the claims herein. One of ordinary skill in the art would recognize many variations, alternatives, and modifications. As shown, the system includes connection to the Internet 101, which couples through powerline gateway 105. The gateway can be any suitable device such as ADSL/router.

The gateway couples to a multiport data communication switch 107. An Ethernet cable 127 couples the multiport data communication switch to the gateway. The multiport data communication switch preferably has at least 24 channels, which couple into each of the three phases P1, P2, and P3, as shown. Further details of the data communication switch can be found in the above Ser. No. 10/712,748 filed Nov. 11, 2003, which claims priority to U.S. Provisional Application No. 60/508,482 filed Oct. 3, 2003, commonly assigned and hereby incorporated for all purposes. Further details of the multiport data communication switch can also be found throughout the present specification and more particularly below.

Each of the phases is couple through one of three sockets in the electrical wiring. Each of the phases P1,P2,and P3 couples to electrical panel 115. Each of the powerline enabled powerlines couples to each of the phases through a breaker switch in preferred embodiments. Each of the phases can relate to a voltage of about 100 to about 120 volts at a frequency of about 60 hertz. Each of the phases can be added together to 240 volts AC or the like.

As also shown, the electrical panel 115 distributes electricity to the first floor, which includes two outlines. Each of the outlets includes a powerline networking device, which converts the digital signal from the powerline to an Ethernet cable, which connects to a personal computer, laptop computer, or other computing device.

To couple the first electrical panel 115 to a second electrical panel 117, coupler device 123 is included. The coupler device capacitively couples each of the phases 1, 2, and 3 to respective phases 1, 2, and 3 between the first electrical panel and the second electrical panel. The second electrical panel, which is now powerline enabled, provides powerline networking capability to the second floor to a plurality of computing devices. As merely an example, electrical plug 131 includes powerline output 135, which couples to powerline device 137, which is coupled to a computing device 143. The powerline device has an Ethernet cable 141 coupled to the computing device and power source through cable 139.

Depending upon the embodiment, the system can also include a second coupler device 125 coupling the second electrical panel to the third electrical panel 121. The third electrical panel provides power and powerline networking capability to the third floor.

Figure 2:
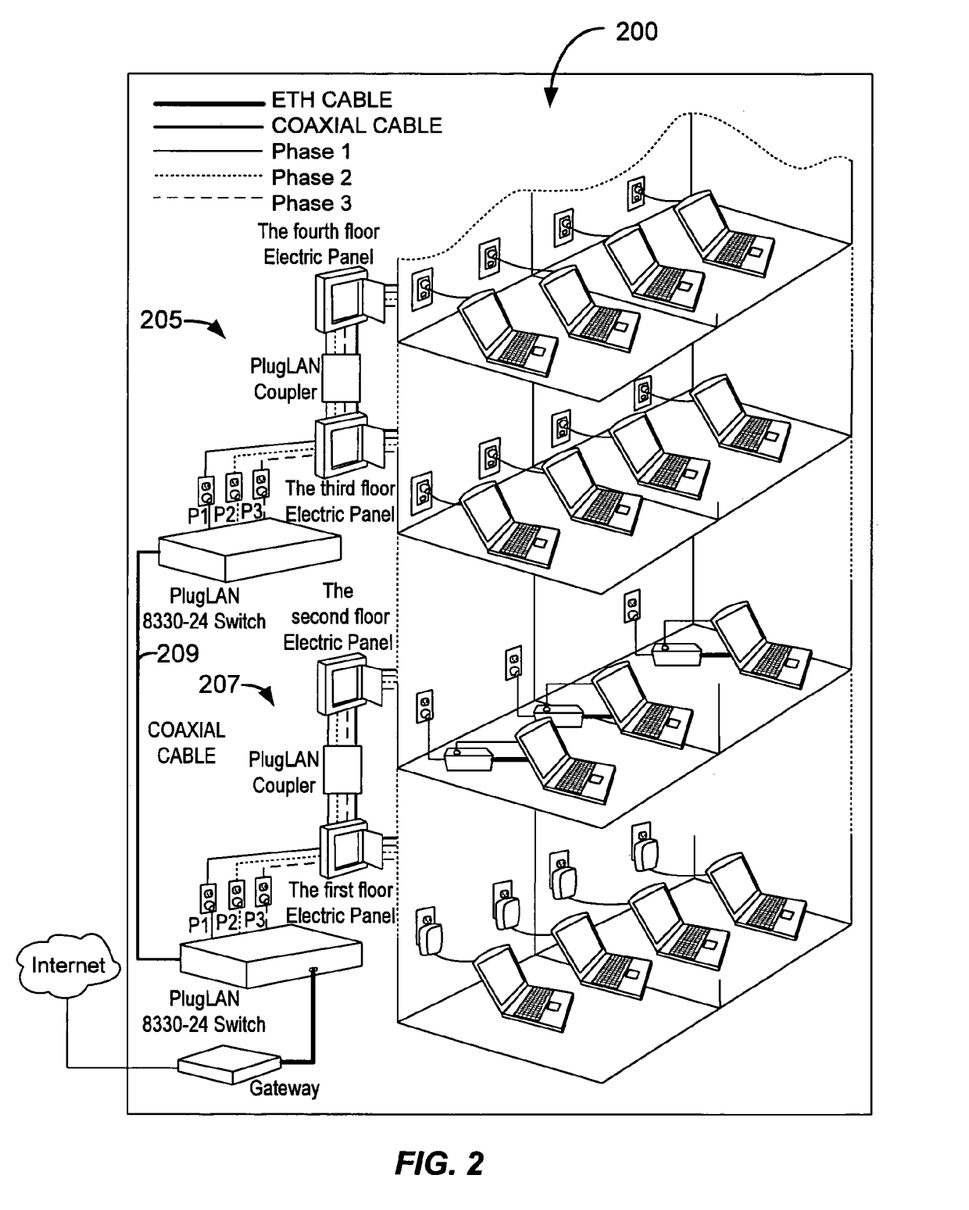
FIG. 2 is a simplified diagram of an alternative powerline system according to an alternative embodiment of the present invention.

FIG. 2 is a simplified diagram of an alternative powerline system 200 according to an alternative embodiment of the present invention. This diagram is merely an example, which should not unduly limit the scope of the claims herein. One of ordinary skill in the art would recognize many variations, alternatives, and modifications. As shown, the system includes a first multiport data communication switch 207, which provides powerline networking capability to the first two floors. A cable couples the first multiport data communication switch to a second multiport data communication switch system 205, which provides powerline networking capability to the third and fourth floors. As also shown, a coupling device couples a first electrical panel to a second electrical panel. A coupling device also couples a third electrical panel to a fourth electrical panel. Of course, there can be other variations, modifications, and alternatives. Further details of a multiport data communication device can be found throughout the present specification and more particularly below.

Figure 3:
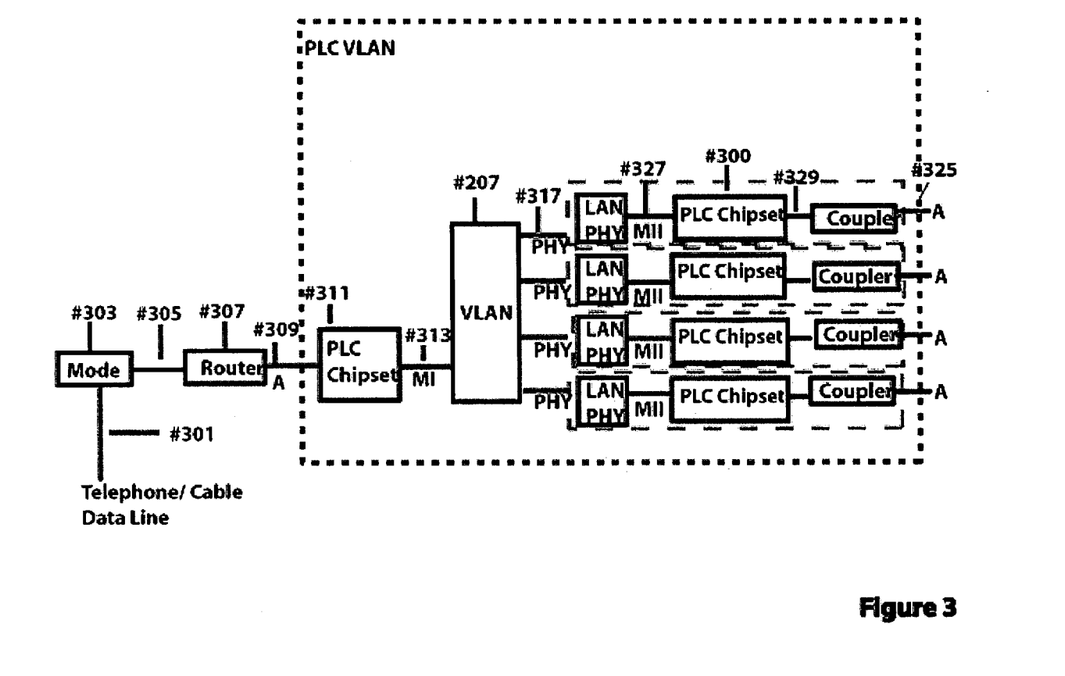
FIG. 3 is a simplified diagram of a multiport powerline apparatus according to an embodiment of the present invention.

FIG. 3 is a more detailed block diagram of a multiport data communication switch apparatus 300 according to an embodiment of the present invention. This diagram is merely an example, which should not unduly limit the scope of the claims herein. One of ordinary skill in the art would recognize many variations, alternatives, and modifications. As shown, the apparatus has a data source connection 301, which is coupled to a data source. The apparatus also has a powerline device 311 coupled to the data source. In certain embodiments, other elements including modem 303 and router 307 are also coupled to the data source. Line 305 interface between the modem and router and powerline 309 interfaces between router and powerline device. The powerline device is adapted to receive and transmit information in a first format from the data source and is adapted to receive and transmit information in a second format. The second format may include MII, GPSI, and other suitable techniques.

As merely an example, the powerline device can be an integrated circuit chip manufactured by INTELLON CORPORATION of Florida. Here, the chip can be a single-chip powerline networking controller with integrated MII/GPSI, USB. The chip interfaces with Ethernet interfaces, among others. Preferably, there is at least a 14 Mbps data rate on the powerline, although others may desirable. Additional features include an Integrated 10-bit ADC, 10-bit DAC and AGC, a selectable MDI/SPI PHY management interface, general purpose 8-wire serial PHY data interface. Preferably, the signal processing uses Orthogonal Frequency Division Multiplexing (OFDM) for high data reliability, as well as adaptive channel characterization, Viterbi and block coding. In alternative embodiments, the powerline device can also include other chip designs that are suitable for the present methods and systems. As merely an example the powerline chip is a DSS9010/DSS7700 manufactured from Design of Systems on Silicon from Valencia, Spain.

The apparatus also has a virtual local area network device 315 that includes a first input/output port via MII 327 and a plurality of second input/output ports 317. Each of the second input/output ports numbered from 1 through N, where N is an integer greater than 1. The apparatus also has a plurality of modem devices 329 coupled to the virtual local area network device. The plurality of modem devices are numbered from 1 through N. Each of the plurality of modem devices is coupled respectively to one of the plurality of second input/output ports. Each of the plurality of modem devices is also coupled to one of a plurality of powerlines numbered 325 from 1 through N. Each of the powerlines is capable of communicating information to and from the data source.

Figure 3A:
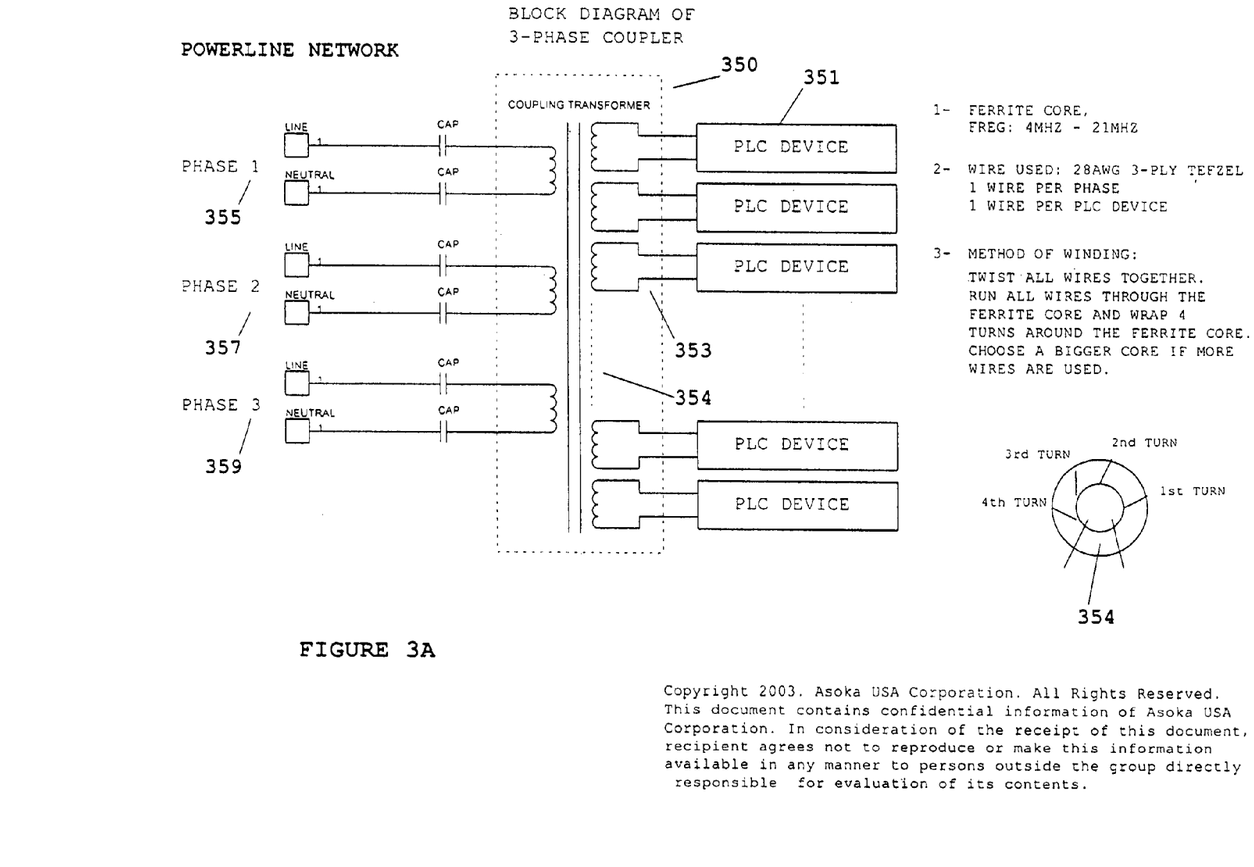
FIG. 3A is a simplified diagram of a three phase coupler device for the multiport powerline apparatus according to an embodiment of the present invention.
Figure 3B:
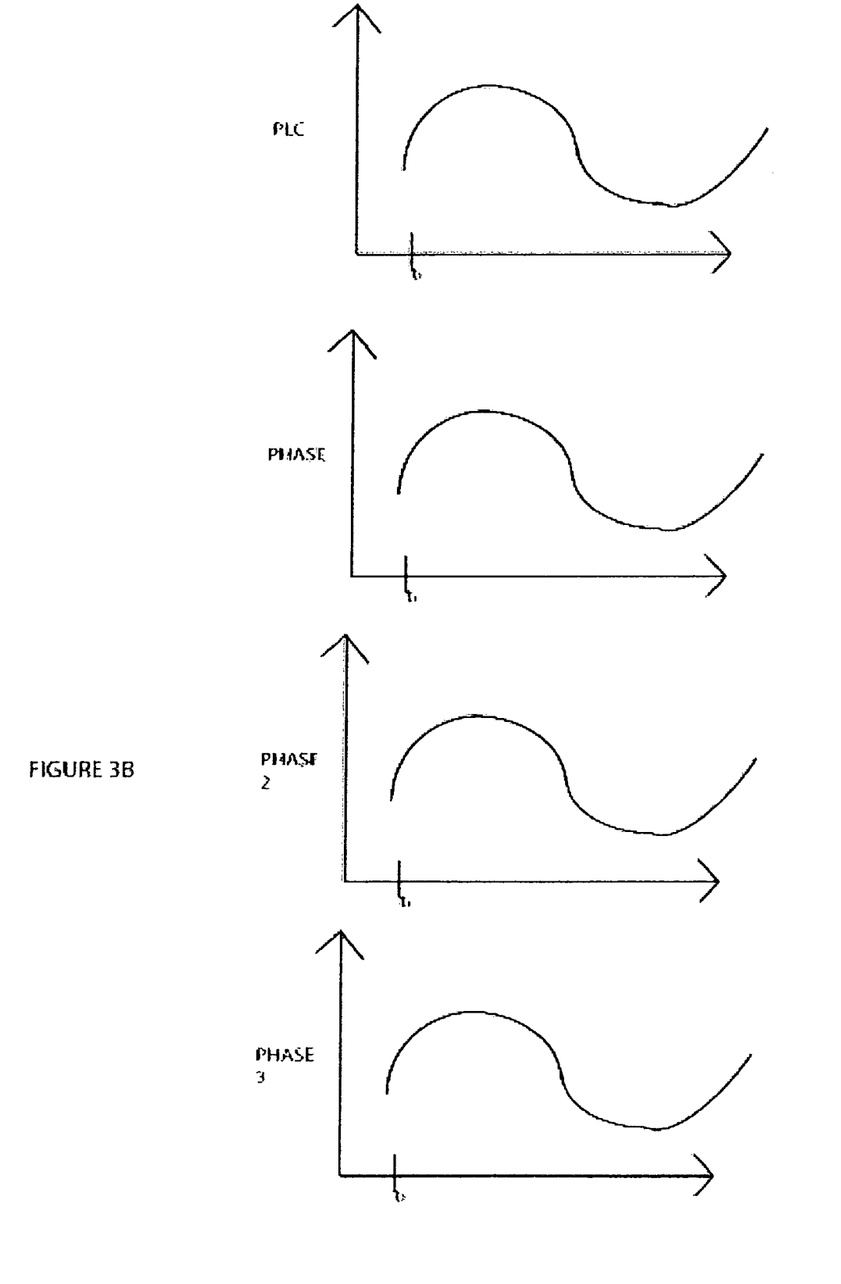
FIG. 3B are simplified data signal plots for phases 1, 2, and 3 according to an embodiment of the present invention.

Preferably, each of the modem devices include select elements. Such elements include an interface module 319, which is coupled to a PLC chipset, which is coupled to coupler 323. The interface module can be any Ethernet PHY to MII converter, or no converter at all if the switch 319 supports MII interface, as well as others. The PLC chipset is from suitable companies such as Intellon, cogency or Velence or others'. The coupler is a capacitive or inductive coupler. Referring to FIG. 3A, a three phase coupler device 350 is shown. As shown, each of the phases 1 355, 2 357, and 3 359 includes a wiring loop that connects from a source and loops back to neutral. A first capacitor and a second capacitor are provided on each side of the wiring loop. That is, a first length of wiring is provided between the first and second capacitors. The first length of wiring is inductively coupled to a plurality of powerline communication devices 351, which are each coupled to a computing device, such as a personal computer, laptop computer, or others. The first length of wiring is often turned around a ferrite core or other core 541. In a preferred embodiment, at least three turns are provided around the core. As shown, each of powerline communication devices also has wiring 353 that is turned around the ferrite core or other core to be inductively coupled to each of the phases, as shown.

As shown, communication between the interface module and the PLC chipset is MII but can also be others. Here, MII is an industry standard. The standard provides an interface between the MAC and PHY sub-layers, such as IEEE 802.3 Ethernet MAC controllers from certain sources. MII has separate 4-bit data paths for transmit and receive data along with carrier sense and collision detection. Data are transferred between the MAC and PHY over each 4-bit data path synchronous with a clock signal supplied to the MAC. The MII interface also provides a two-wire bi-directional serial management data interface, which provides access to the status and control registers in the MAC. Further details of the MII can be found in the IEEE 802.3u Standard. The PLC chipset input/outputs information in analog format, which is transmitted through the powerline via the coupler. Of course, there may be variations, alternatives, and modifications. The multiport data communication device has multiple ports, which can be used throughout a building structure. To allow access to such communication device, the coupler device is provided between electrical panels to provide powerline networking capability to multiple panels. Further details of the coupler device can be found throughout the present specification and more particularly below.

Figure 4:
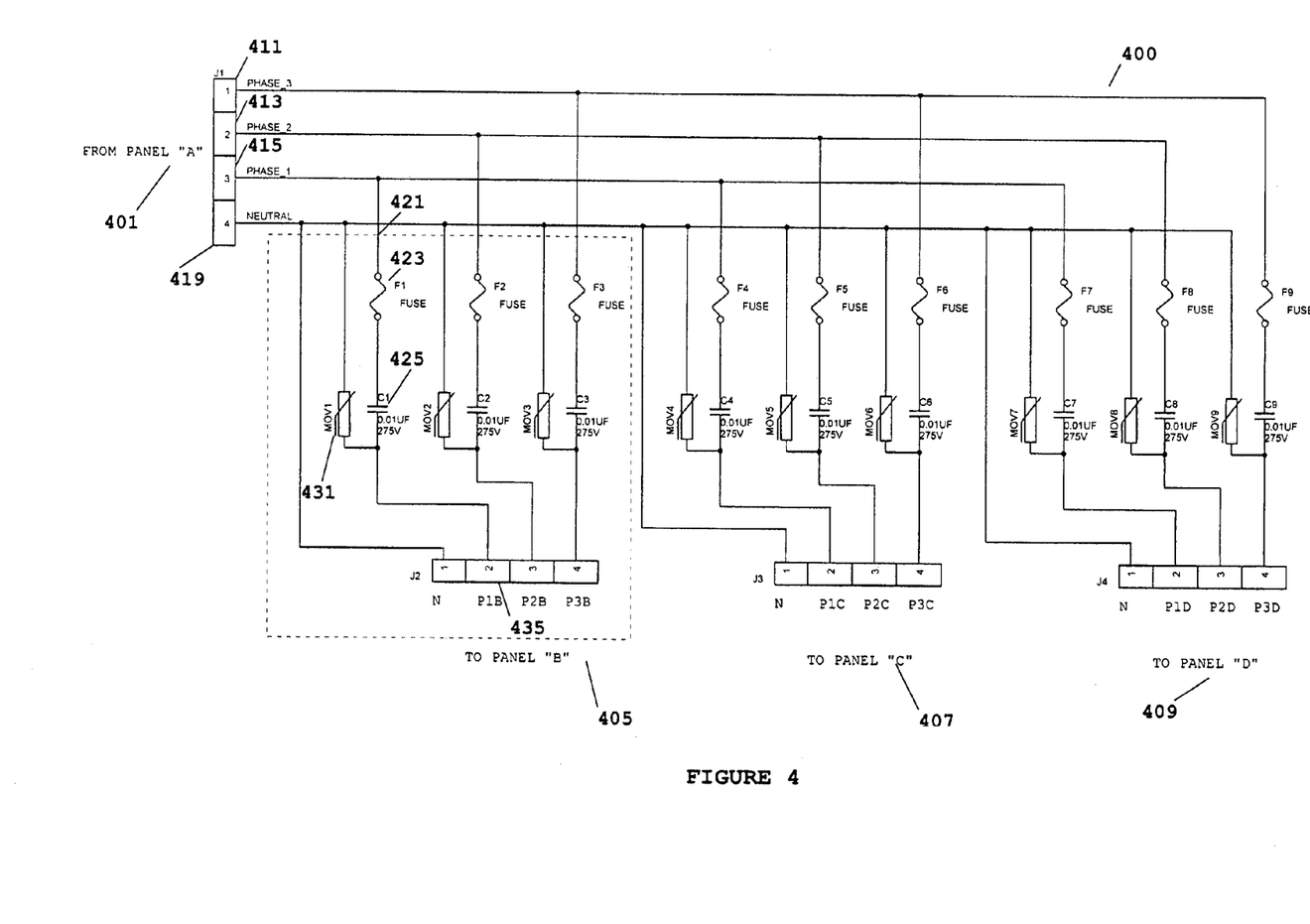
FIG. 4 is a simplified diagram of an AC coupling device according to an embodiment of the present invention.

FIG. 4 is a simplified diagram of an AC coupling device 400 according to an embodiment of the present invention. This diagram is merely an example, which should not unduly limit the scope of the claims herein. One of ordinary skill in the art would recognize many variations, alternatives, and modifications. As shown, the system includes a first panel 401, which is listed as Panel A. The system also includes other panels such as Panel B 405, Panel C 407, and Panel D 409, and possibly others, or fewer panels depending upon the embodiment. As shown, Panel A includes at least three phases, such as Phase 1 415, Phase 2 413, and Phase 3 411. The panel also includes a neutral line, which are all provided on breaker devices. Each of the phases is capacitively coupled to a respective phase wiring on the building structure side. That is, phase 1 is coupled to capacitor 425. A fuse is often provided between wiring 421 and the capacitor. To prevent any problems associated with disruptions, etc., a surge protection device 431 is connected between neutral and the building side of the panel. The surge protection device can be any suitable mechanism such as a diode, transient voltage suppressor (TVS), zener diode, metal oxide varistor (MOV), and varistor. Of course, one of ordinary skill in the art would recognize many variations, modifications, and alternatives.

In a preferred embodiment, the present invention provides a powerline network system for building area networking. The system has a multichannel data communication device comprising at least N channels. A powerline coupler is coupled to each of the N channels. A first powerline panel box (e.g., Panel A) comprises a first phase, a second phase, and a third phase. A second powerline panel box (e.g., Panel B) comprises a first phase, a second phase, and a third phase. An AC coupling device is coupled between the first powerline panel box and the second powerline panel box. In a preferred embodiment, the AC coupling device has a first capacitor coupling a first phase of the first powerline panel box to a first phase of the second powerline panel box, a second capacitor coupling a second phase of the first powerline panel box to a second phase of the second powerline panel box, and a third capacitor coupling a third phase of the first powerline panel box to a third phase of the second powerline panel box. The system has a first powerline network coupled to the first phase, the second phase, and the third phase of the first powerline panel. The system also has a second powerline network coupled to the first phase, the second phase, and the third phase of the second powerline panel. In a preferred embodiment, the system has a first set of channels derived from the N channels in the first powerline network and a second set of channels derived from the N channels in the second powerline network. Depending upon the embodiment, certain methods for installing the present system can be found throughout the present specification and more particularly below.

In an alternative specific embodiment, the present invention provides a method for converting a first electrical wiring distribution in a first portion of a building structure and a second electrical wiring distribution in a second portion of the building structure into a first powerline communication network and a second powerline communication network as briefly described below:

1. Provide multiunit building structure without powerline networking capability;

2. Installs a multichannel data communication device comprising at least N channels within a portion of a spatial location of the building structure;

3. Couple the communication device to a first electrical panel box;

4. Couple the communication device to a networking connection;

5. Identify a first electrical panel box;

6. Identify a second electrical panel box;

7. Install an AC coupling device between the first power panel box comprising a first phase, a second phase, and a third phase and a second powerline panel box comprising a first phase, a second phase, and a third phase;

8. Connect a first capacitor coupling a first phase of the first powerline panel box to a first phase of the second powerline panel box;

9. Connect a second capacitor coupling a second phase of the first powerline panel box to a second phase of the second powerline panel box;

10. Connect a third capacitor coupling a third phase of the first powerline panel box to a third phase of the second powerline panel box;

11. Initiate operation of the multichannel communication device to provide transfer of data signals in a first format to a second format;

12. Form a first powerline network coupled to the first phase, the second phase, and the third phase of the first powerline panel;

13. Form a second powerline network coupled to the first phase, the second phase, and the third phase of the second powerline panel; and 14. Perform other steps, as desired.

The above sequence of steps provides a method according to an embodiment of the present invention. As shown, the method uses a combination of steps including a way of installing a multiport communication device onto a electrical distribution structure of a building. Other alternatives can also be provided where steps are added, one or more steps are removed, or one or more steps are provided in a different sequence without departing from the scope of the claims herein. Further details of the present method can be found throughout the present specification and more particularly below.

Figure 5:
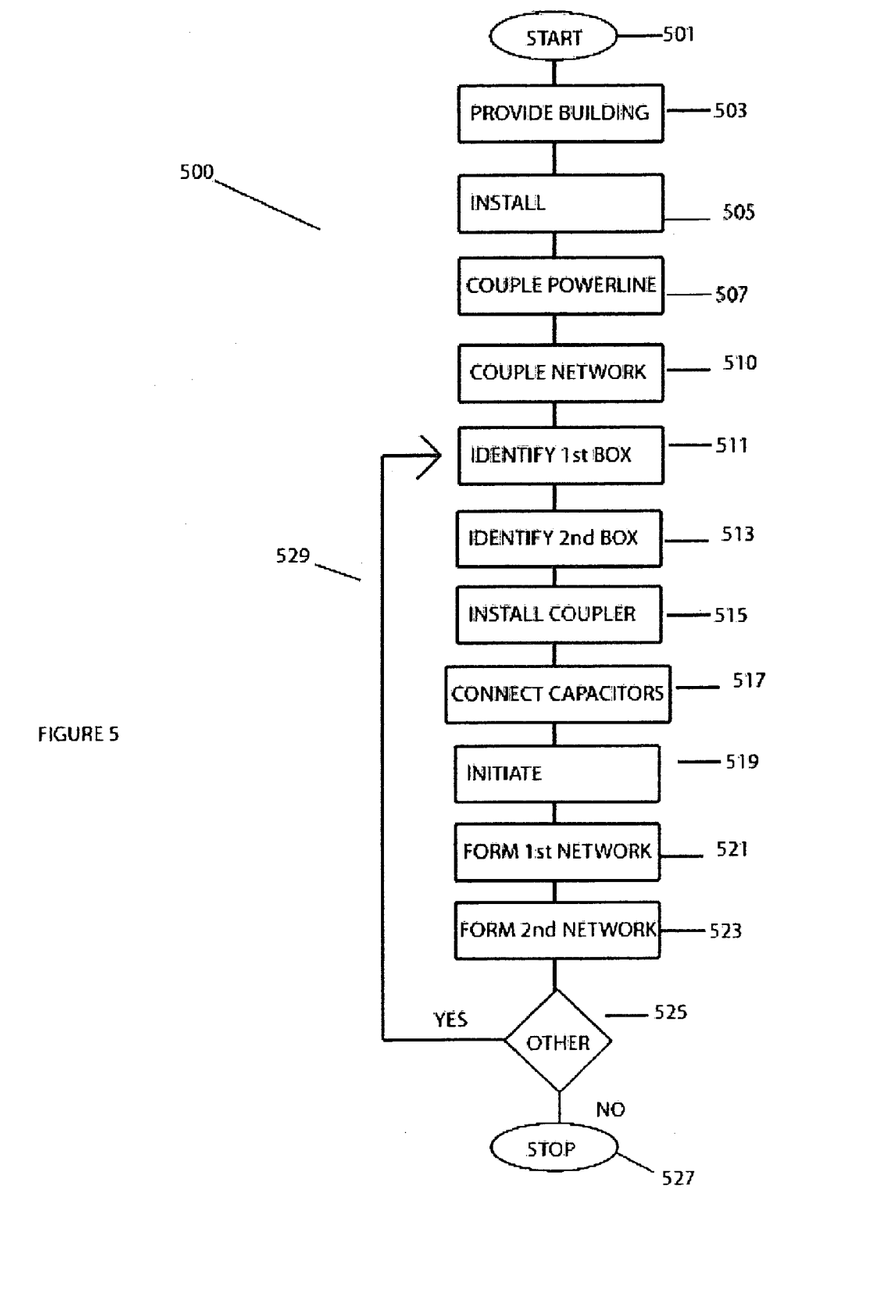
FIG. 5 is a simplified diagram of an installation method according to an embodiment of the present invention.

FIG. 5 is a simplified diagram of an installation method according to an embodiment of the present invention. This diagram is merely an example, which should not unduly limit the scope of the claims herein. One of ordinary skill in the art would recognize many variations, alternatives, and modifications. As shown, the present method is for converting a first electrical wiring distribution in a first portion of a building structure and a second electrical wiring distribution in a second portion of the building structure into a first powerline communication network and a second powerline communication network. As shown, the method begins with step 501, which is start.

The method includes providing (step 503) multiunit building structure without powerline networking capability. The building structure can be an apartment, an office building, a hotel, or housing, according to an embodiment of the present invention. The structure includes multiple users that desire to have independent access to computer networks such as the Internet or the like. As merely an example, the building structure includes multiple structures of a hotel according to a specific embodiment.

In a specific embodiment, the method installs (step 505) a multichannel data communication device comprising at least N channels within a portion of a spatial location of the building structure. The device can be a switch, such as those sold by CISCO, as well as others. The method couples (step 507) the communication device to a first electrical panel box, which often includes at least three phases, and is characterized by about 480 volts. Each of the phases relates to voltages ranging from about 100 to 120 volts AC according to a preferred embodiment.

The method also couples the communication device to a networking connection. In a preferred embodiment, the networking connection is an ISDN or other broadband service. The networking connection can be brought in through DSL, ADSL, cable networking, wireless, and optical networking techniques. Of course, the networking technique depends upon the specific application.

As further shown, the method identifies a first electrical panel box (step 511) and a second electrical panel box (step 513). Other boxes can also be identified depending upon the embodiment. Details of these panels can be found throughout the present specification and more particularly in FIGS. 1 and 2 above, although other panels can also be used.

The method installs (step 515) an AC coupling device between the first power panel box comprising a first phase, a second phase, and a third phase and a second powerline panel box comprising a first phase, a second phase, and a third phase. In a preferred embodiment, the AC coupling device includes a plurality of capacitors (step 517) that capacitively couple the data signal from the first panel to the second panel.

In a specific embodiment, the method connects a first capacitor coupling a first phase of the first powerline panel box to a first phase of the second powerline panel box. The method connects a second capacitor coupling a second phase of the first powerline panel box to a second phase of the second powerline panel box. The method also connects a third capacitor coupling a third phase of the first powerline panel box to a third phase of the second powerline panel box. Depending upon the embodiment, the coupling device can also include surge protection devices, fuses, and other devices to facilitate operation of the present system.

The method initiates operation (step 519) of the multichannel communication device to provide transfer of data signals in a first format to a second format. The method forms a first powerline network (step 521) coupled to the first phase, the second phase, and the third phase of the first powerline panel. Through use of the coupling device, the method forms a second powerline network coupled to the first phase, the second phase, and the third phase of the second powerline panel. Depending upon the embodiment, the method can also perform other steps, step 525, which may include adding additional electrical panels via couplers as illustrated by branch 529. Otherwise, the method stops at step 527.

The above sequence of steps provides a method according to an embodiment of the present invention. As shown, the method uses a combination of steps including a way of installing a multiport communication device onto a electrical distribution structure of a building. Other alternatives can also be provided where steps are added, one or more steps are removed, or one or more steps are provided in a different sequence without departing from the scope of the claims herein.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A powerline network device comprising:
    a first network interface connected to a data source, the first network interface being configured to receive network data in a first format;
    a first powerline communication module configured to convert data from the first format to a second format, the first powerline communication module being coupled to the first network interface;
    a switch having an input port and N output ports, the input port being connected to the first powerline communication module;
    a plurality of powerline communication modules, the plurality of power communication modules including a second powerline communication module and a third powerline communication module, the plurality of the power communications being coupled to the N output ports; and
    a first powerline coupler, the first powerline coupler being configured to couple a first data signal from the second powerline communication module to a first phase, a second phase, and a third phase of a powerline, each of the phases being couple to a power signal, the first phase and the second phase being characterized by a same phase angle.

2. The device of claim 1 wherein the second format comprises OFDM format.

3. The device of claim 1 further comprising a second power line coupler, the second powerline coupler being configured to couple a second data signal from the third powerline communication module to each of the first phase, the second phase, and the third phase of a powerline.

4. The device of claim 1 wherein N is 16.

5. The device of claim 1 wherein N is 24.

6. The device of claim 1 wherein the first powerline coupler is coupled to a power transformer, the power transformer being connected to a public utility line.

7. The device of claim 6 wherein the power transformer device comprises a first output for the first phase, a second output for the second phase, and a third output for the third phase.

8. The device of claim 1 wherein the first powerline coupler comprises a capacitive coupling using capacitors.

9. The device of claim 1 wherein the first powerline coupler comprises a first capacitor and a second capacitor and a length of wiring between the first capacitor and the second capacitor.

10. The device of claim 9 wherein the length of wiring is coupled to a core device, the core device inductively coupling the length of wiring to a powerline communication device, the powerline communication device being coupled to a computing device.

11. The device of claim 1 further comprising a routing device coupled to the first network interface.

* * * * *